(12) United States Patent
Zanier et al.

(10) Patent No.: US 6,243,965 B1
(45) Date of Patent: Jun. 12, 2001

(54) ELECTRONIC MICROMETER

(75) Inventors: Adriano Zanier, Prilly; Arthur Bovey, Lausanne; Lucien Borgognon, Morges, all of (CH)

(73) Assignee: Brown & Sharpe Tesa SA, Renens (CH)

( * ) Notice: Subject to any disclaimer, the term of this patent is extended or adjusted under 35 U.S.C. 154(b) by 0 days.

(21) Appl. No.: 09/354,335

(22) Filed: Jul. 16, 1999

(30) Foreign Application Priority Data

Jul. 17, 1998 (EP) .................................................. 98810690

(51) Int. Cl.⁷ ...................................................... G01B 3/18
(52) U.S. Cl. .................................................. 33/831; 33/705
(58) Field of Search ............................. 33/813, 819, 820, 33/828, 831, 703, 705

(56) References Cited

U.S. PATENT DOCUMENTS

| | | | |
|---|---|---|---|
| 3,340,616 | * 9/1967 | Mincuzzi | ................................ 33/819 |
| 3,971,137 | 7/1976 | Fernandez . | |
| 4,255,861 | * 3/1981 | Nakata et al. | .......................... 33/820 |
| 4,550,507 | * 11/1985 | Nishikata | ................................ 33/703 |
| 4,561,185 | * 12/1985 | Sakata et al. | .......................... 33/817 |
| 4,578,868 | 4/1986 | Sasaki et al. . | |
| 5,029,401 | * 7/1991 | Masom | ................................... 33/705 |
| 5,288,292 | 2/1994 | Giraud et al. . | |
| 5,433,016 | 7/1995 | Tachikake et al. | ................... 33/820 |
| 5,829,155 | * 11/1998 | Takahashi et al. | ..................... 33/813 |
| 6,115,934 | * 9/2000 | Sato et al. | ............................... 33/831 |

FOREIGN PATENT DOCUMENTS

| | | |
|---|---|---|
| 0791801 | 8/1997 | (EP) . |
| 0836076 | 4/1998 | (EP) . |
| 6-194102 | 7/1994 | (JP) . |

OTHER PUBLICATIONS

Patent Abstracts of Japan, vol. 95, No. 9, Oct. 31, 1995 & JP 07159102A (Mitsutoyo Corp.), Jun. 23, 1995.

\* cited by examiner

*Primary Examiner*—G. Bradley Bennett
(74) *Attorney, Agent, or Firm*—Jacobson, Price, Holman & Stern, PLLC

(57) ABSTRACT

The electronic micrometer includes a casing defining at least an internal volume, in which are disposed a sleeve having an at least partially threaded inner surface. A screw is engaged in this sleeve and is able to be put in rotation with respect to the sleeve in such a way as to displace itself along the longitudinal measuring axis (x) of the device. There is a capacitive system of measurement for measuring the relative rotation of the screw with respect to the sleeve and for determining, starting with that measurement, the longitudinal position of the screw. The casing comprises two half-shells. At least one filiform joint allows the internal volume inside the casing to be sealed. Other sealing means are provided to prevent any infiltration of water or of dust into this internal volume. Accordingly, micrometer are protected.

18 Claims, 6 Drawing Sheets

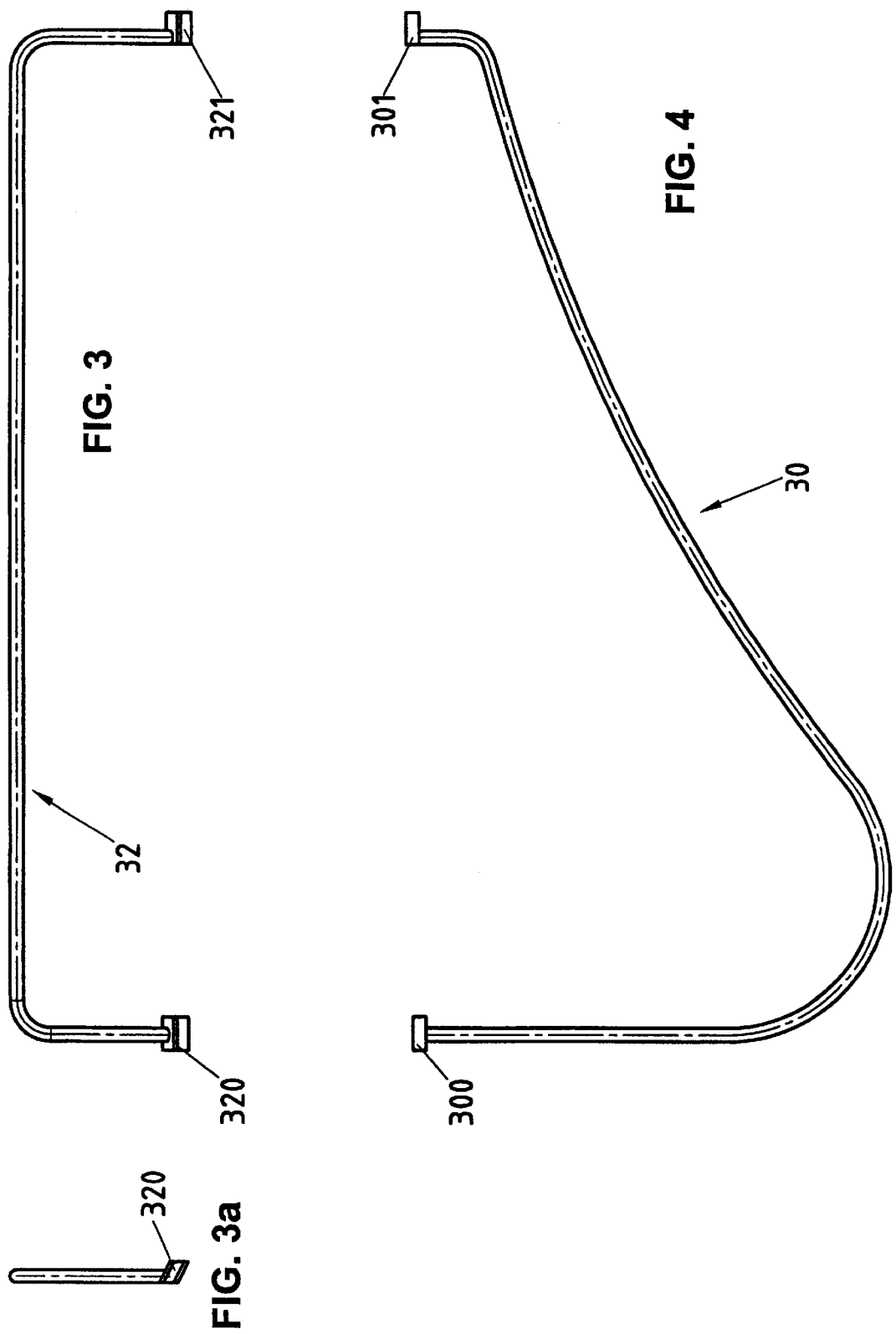

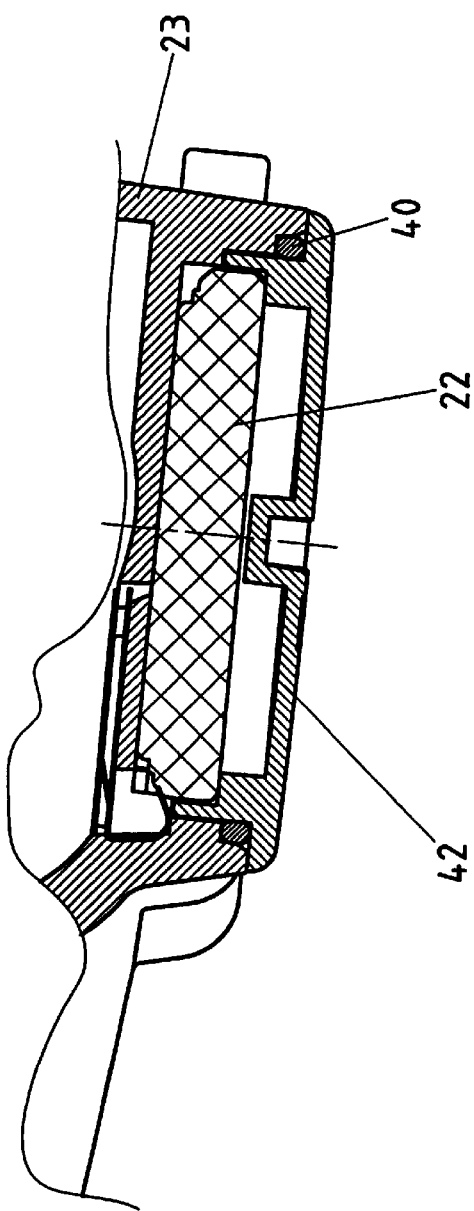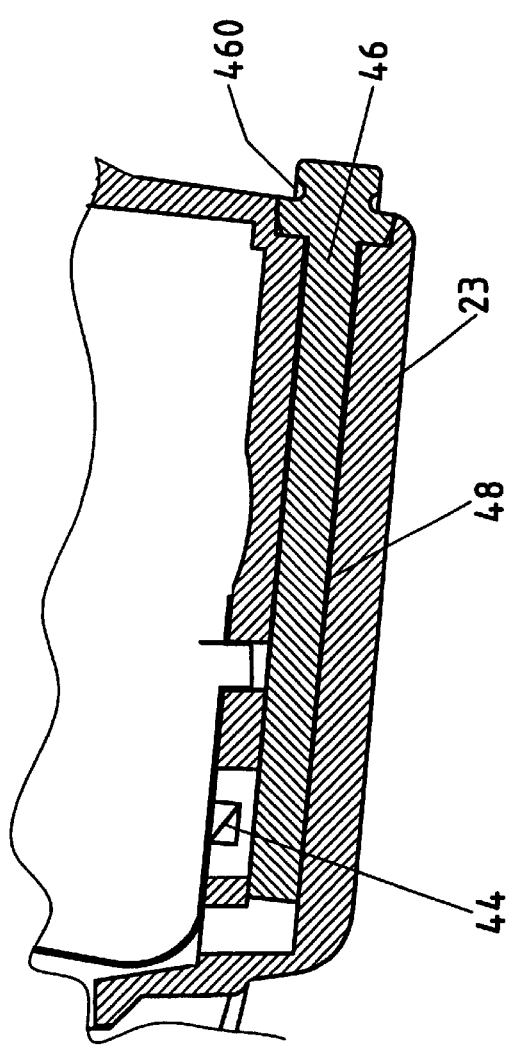

ELECTRONIC MICROMETER

BACKGROUND OF THE INVENTION

Field of the Invention

This invention relates to a micrometer, in particular a fluid-tight electronic micrometer.

Electronic micrometers are known in which the measured distance is determined by an electronic system of measurement, for example a capacitive system, and is displayed on an electronic display, for example a liquid crystal display. Compared to conventional mechanical micrometers, these electronic micrometers have in particular the advantage of notably improved reading comfort as well as the possibility of storing and transferring the values measured.

These devices must be kept sufficiently clean in order to function, and are thus badly suited to operate in a humid environment or an environment subject to dust, or to splashing of lubricant or cutting oil. In particular, it is important to see to it that the capacitive electrodes of the measuring system remain free of any humidity.

U.S. Pat. No. 5,433,016 to Tachikake et al describes an electronic micrometer having different means for preventing the infiltration of water into certain portions of the micrometer. In particular, annular joints are provided to stop the infiltration of water along the screw. A tube made of a thermosetting shrinkable material protects certain mechanical elements, in particular the mechanism for adjusting the play between the screw and the sleeve. An opening through the casing allows the pressure inside the latter to be equalized with the external atmospheric pressure. Nothing is provided in the described device, however, to protect the capacitive electrodes, the electronic measuring circuit and the display or the threaded portion of the micrometric screw or of the sleeve from infiltration of water.

The patent publications JP-7-159102 and JP-6-194102 describe similar micrometers in which only part of the components are protected from humidity.

SUMMARY OF THE INVENTION

An object of the present invention is thus to propose an electronic micrometer improved with respect to the micrometers of prior art. In particular, an object of the present invention is to propose a micrometer better suited to operating in a dirty or humid environment or one subject to dust, or to splashing of lubricant or cutting oil, for example.

According to the invention, these objects are attained by means of a micrometer having a casing defining at least one internal volume, in which the main mechanical and electronic components of the micrometer are disposed, in particular the electronic components and the threaded portions of the sleeve and of the micrometric screw. The entire internal volume of the casing is tight; all the components disposed in the casing are therefore protected.

The invention relates moreover to different types of joints selected and disposed in such a way as to obtain this imperviousness.

The invention thus allows the assembly of electronics and transducers of the micrometer to be protected as well as the threaded portion of the screw and of the sleeve.

BRIEF DESCRIPTION OF THE DRAWINGS

The invention will be better understood with the aid of the description, given by way of example and illustrated by the attached figures:

FIG. 3 is a side view of the upper filiform joint of the invention intended to prevent infiltration of water between the upper part of the two half-shells.

FIG. 3a is a front view of the upper filiform joint.

FIG. 4 is a side view of the lower filiform joint of the invention intended to prevent infiltration of water between the lower part of the two half-shells.

FIG. 10 is a sectional view of a portion of the casing, intended to show in particular the battery and the sealing joint for the battery.

FIG. 11 is a sectional view of another portion of the casing intended to show in particular the sealing plug at the serial port of the micrometer.

DESCRIPTION OF THE INVENTION

Figure 1:
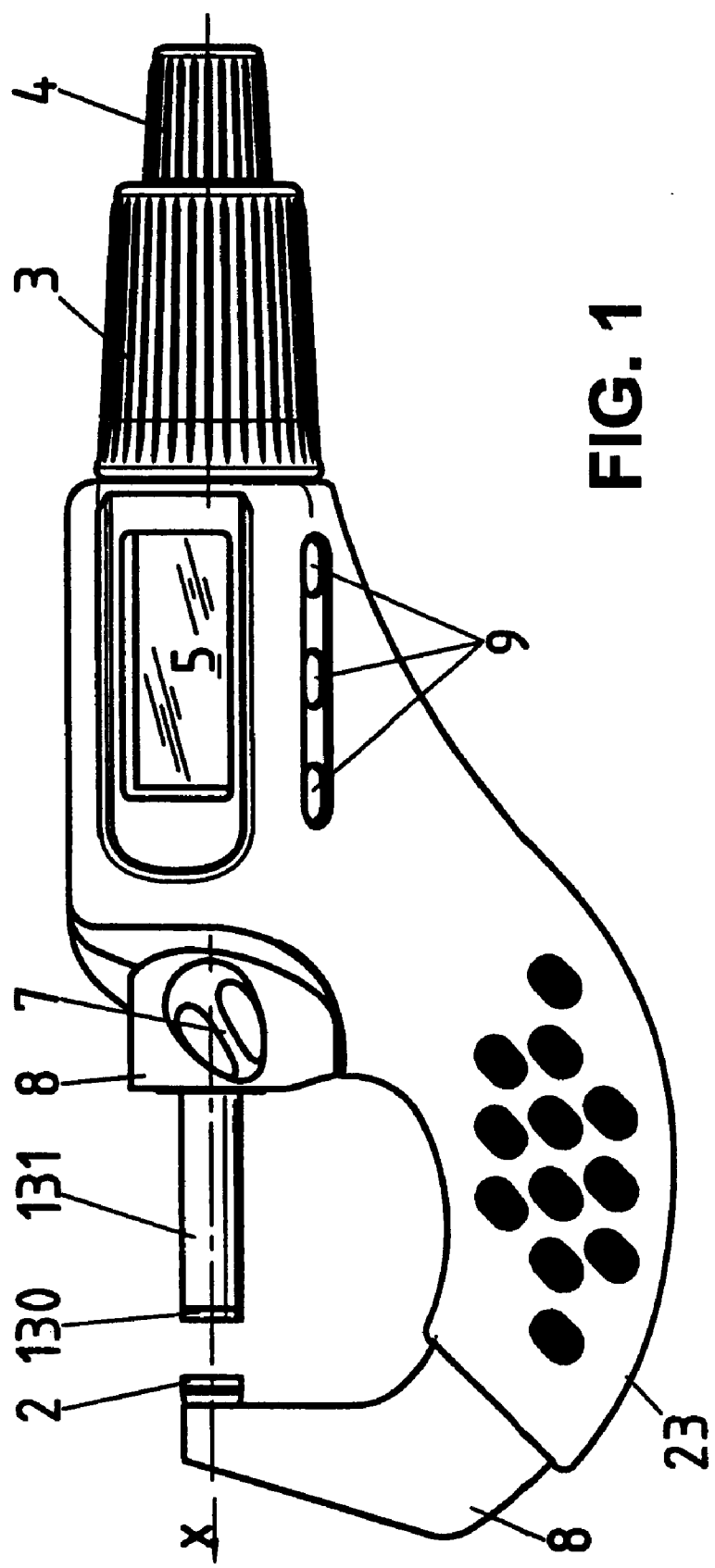
FIG. 1 is a side view of the an electronic micrometer.

FIG. 1 presents a view from the side of an electronic micrometer allowing the distance between the attached tip of the spindle 131 (integral with the micrometric screw 1) and the anvil 2, integral with the jaw and with the body 8 of the micrometer. The distance measured is displayed on a screen 5, for example on a liquid crystal display, the display being controlled by the function keys 9, allowing, for example, the unit of measure to be selected or allowing a choice between measurement of absolute or relative distances. The spindle 131 can be displaced along the longitudinal measuring axis x by turning the thimble 3, or, for a quicker displacement, the thimble fitting 4. The displacement of the screw can be blocked in any position by means of a blocking lever 7. The entire device is protected against shocks and infiltration of water by a casing of synthetic material 23.

Figure 2:
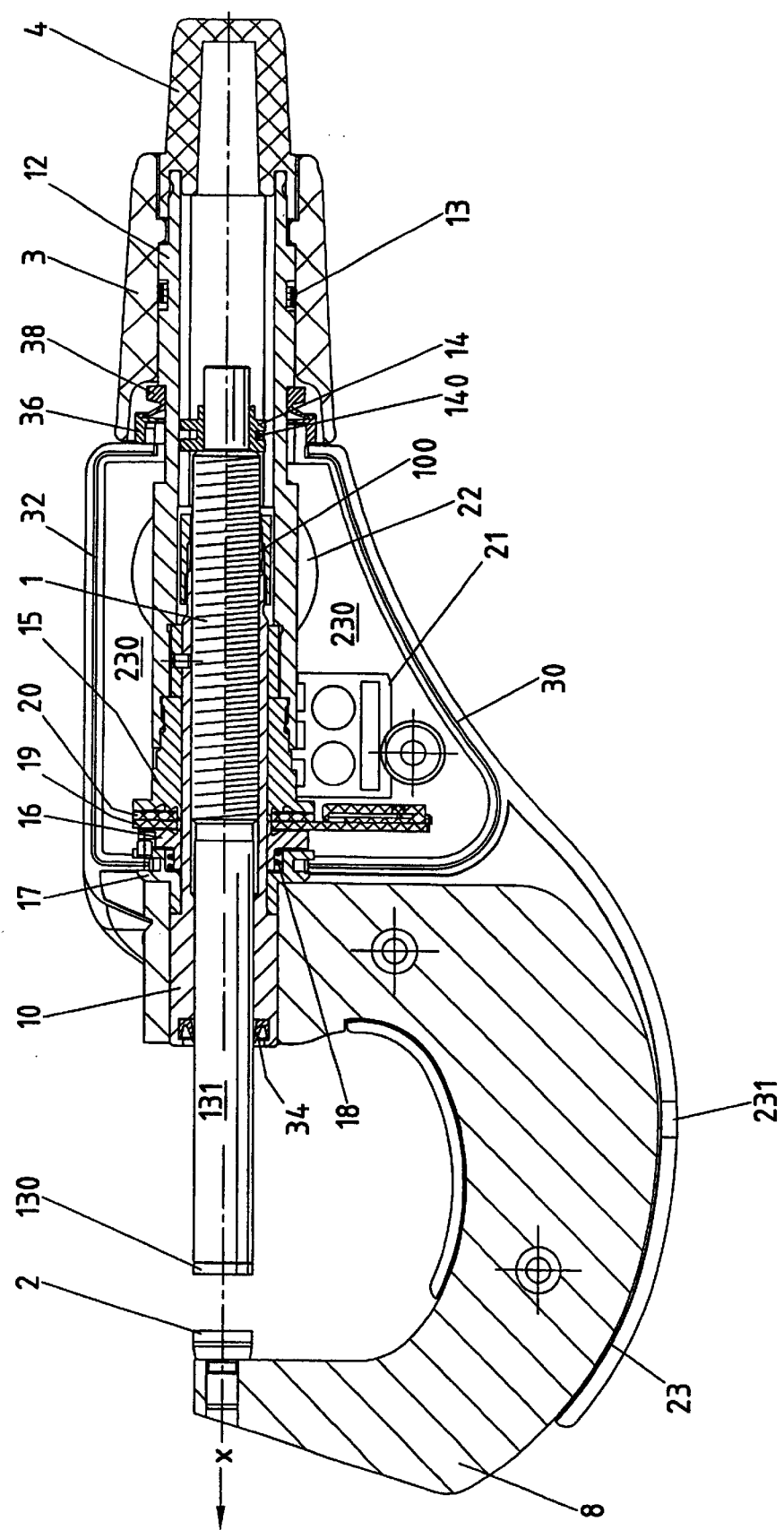
FIG. 2 is a sectional view of a micrometer according to the invention.

FIG. 2 presents a sectional view of the micrometer of FIG. 1, illustrating in particular the components of the micrometer protected by the synthetic casing 23. The micrometer comprises a screw 1 being able to be put in rotation with respect to the threaded sleeve 10, integral with the body 8 of the micrometer, by means of the thimble 3 through the agency of the friction spring 13, of the friction ring 12 and of the interim piece 14 mounted on the end of the screw 1. A spring 140 mounted in a peripheral groove about the interim piece 14 allows the rotation of the friction ring 12 to be transmitted to the screw 1. The precision of pitch on the threaded portion of the screw 1 and of the sleeve 10 is preferably better than 0.001 millimeters, and determines in particular the precision of the micrometer.

The friction spring 13 allows the thimble 3 to be decoupled from the screw, in particular at the end of the course or when the end of the spindle is in contact with the piece to be measured, and thus allows a nearly constant measuring pressure to be ensured. However, the screw can also be set in rotation directly by the fitting 4, in particular to ensure a very rapid displacement over long distances. The thimble 3 and the fitting 4 are made preferably of striated synthetic material in order to ensure comfortable contact, a good grip and an aesthetic adapted to the casing 23. In the case of micrometers of large dimensions, a motorized displacement is also conceivable. Other means of transmitting the rotation between the thimble and the screw, including, for example, a ratchet device such as described in particular in the patent application EP-A2-791801, can be used within the framework of this invention.

By turning the thimble 3, the screw 1 is thus displaced longitudinally with respect to the threaded sleeve 10. A fixed transducer support 16 is mounted on the threaded sleeve 10 through the agency of an assembly collar 17 and a spring 18. A scale support 15 is set in rotation by the ring 12 upon rotation of the screw 1. The two supports 16, respectively 15, each bear a transducer 19, respectively a scale 20, mounted opposite and each provided with a set of capacitive electrodes. The superimposing of the two sets of electrodes determines the angular position of the scale 20 relative to the fixed transducer. An electronic circuit 21, supplied by a battery 22, enables feed of the capacitive electrodes and determination of the angular position of the scale 20, starting from the measurement signals received. The electronic circuit 21 is preferably mounted on a flexible printed circuit enabling the mounting in a casing of reduced size to be facilitated. By measuring the number of turns carried out by the scale 20 starting from a predetermined position, the electronic circuit 21 thus succeeds in calculating the longitudinal position of the micrometric screw 1 and in displaying this information on the screen 5 or transmitting it to an external device through the serial interface 44 (FIG. 11). Examples of suitable capacitive transducers are described in U.S. Pat. No. 4,578,868 to Saski et al. The patent application EP 836076 describes an example for a suitable electronic circuit 21. One skilled in the art will understand that other types of measuring systems, including magnetoresistive, optical or purely mechanical, conventional systems, can be used within the framework of this invention.

According to the invention, the casing 23 of the micrometer comprises an impermeable internal volume 230 in which all the electronic components is disposed, including the transducers 19, 20, as well as the main moving and threaded parts of the micrometer. A casing comprising a plurality of distinct, internal volumes for accommodating these different components can also be realized. All the components mounted inside the casing 23 is thus protected against infiltration from outside.

The casing 23 is preferably made up of two half-shells of synthetic material, only one half-shell being visible in FIGS. 1 and 2. The two half-shells are held together by means of the closing ring 36 shown in more detail in FIG. 6, as well as the assembly collar 17, illustrated in FIG. 8. Other means of putting together the two half-shells can also be used, for example screw means or snapping together.

An upper filiform joint 32, shown in more detail in FIGS. 3 and 3a, enables prevention of infiltration of water or of dust between the upper part of the two half-shells. In a similar way, a lower filiform joint 30, illustrated more specifically in FIG. 4, allows the lower part of the interstice between the two half-shells to be made tight. The two joints are made, for example, of synthetic material or caoutchouc, and are preferably accommodated in a suitable groove made in the profile of each half-shell, the cross-section of the filiform joints corresponding to that of the recess constituted by the two grooves when the half-shells are put together. In order to prevent any torsion of the joints in the grooves, this cross-section is preferably selected so as to be non-circular, for example triangular or square as illustrated. One end 300, respectively 320, of the filiform joints 30, respectively 32, is accommodated in a groove 170 of the assembly collar 17, whereas the other end 301, respectively 321, of the two joints enables prevention of infiltration through the back of the micrometer.

It is likewise possible, within the framework of this invention, to use a single filiform joint to seal the entire interstice between the two half-shells and to prevent infiltration between the assembly collar 17, respectively the closing ring 36, and each half-shell.

Figure 5:
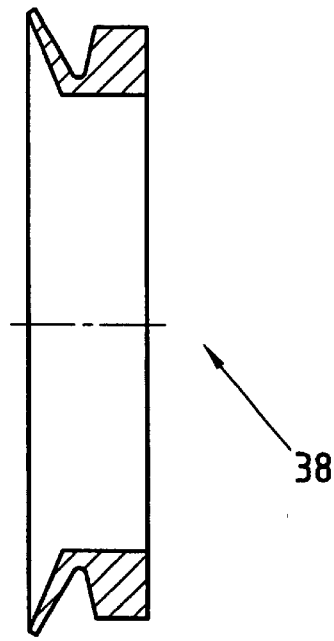
FIG. 5 is a side view of the V-shaped axial joint according to the invention, intended to prevent infiltration along the friction ring.

Illustrated in FIG. 5 is the shape of the joint 38 intended to prevent infiltration of liquids along the friction ring 12. The joint 38 is maintained longitudinally between the friction ring 12 and a bearing surface 361 on the closing ring 36. In a preferred variant of the invention, the joint 38 is a V-joint, ensuring an optimal impermeability when it is slightly compressed longitudinally. The joint is driven in rotation with the friction ring 12 and rubs against the fixed closing ring 36; therefore a joint treated with Teflon will preferably be used, with lifetime lubrication.

Figure 6:
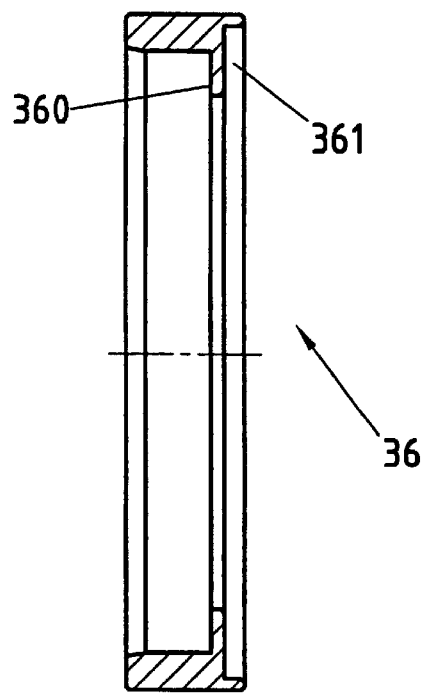
FIG. 6 is a sectional view of the closing ring according to the invention intended in particular to keep in position the two half-shells of the casing.

FIG. 6 shows the closing ring 36 allowing the two half-shells of the casing 23 to be fitted together and the joint 38 to be kept in place. The ring comprises an inner bearing surface 360 into which an adapted portion of the half-shells is forced. The bearing surface 361, already mentioned, offers a smooth contact surface for the joint 38; this surface is preferably polished with very great care in order to reduce the wear and tear on the joint 38; a ring 36 of stainless steel is preferably used. The tightness between the ring 36 and the half-shells is ensured by the compression of the latter against the bearing surface 360; as indicated, the tightness between the ring and the friction ring 12 is ensured by the V-joint 38. If necessary, in a variant of the invention, a supplementary joint, for example an O-ring gasket, can be disposed between the ring 36 and the half-shells of the casing 23.

Figure 7:
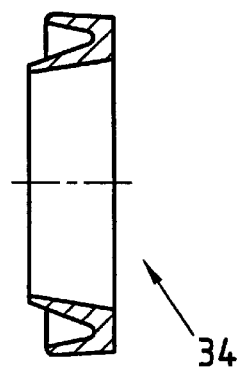
FIG. 7 is a side view of a spindle joint according to the invention, intended to prevent infiltration between the spindle and the sleeve.

Illustrated in FIG. 7 is the shape of the spindle joint 34, which makes it possible to prevent infiltration between the spindle 131 and the sleeve 10. This joint is accommodated in an adapted annular groove in the sleeve 10. The spindle joint 34 is preferably a radial lip seal, able to remain tight even after a number of great rotations of the spindle 131. A joint treated with Teflon will preferably be adopted.

The tightness between the sleeve 10 and the jaw 8, or between the jaw 8 and the casing 23, is not ensured. The humidity and the dust able to infiltrate is kept back by the filiform joints 30, 32, however, before reaching the interior of the volume 230 containing the sensitive elements of the micrometer. A hole 231 in the lower portion of at least one of the half-shells 23 allows the water which may have infiltrated between the jaw 8 and the casing 23 to exit again.

Figure 8:
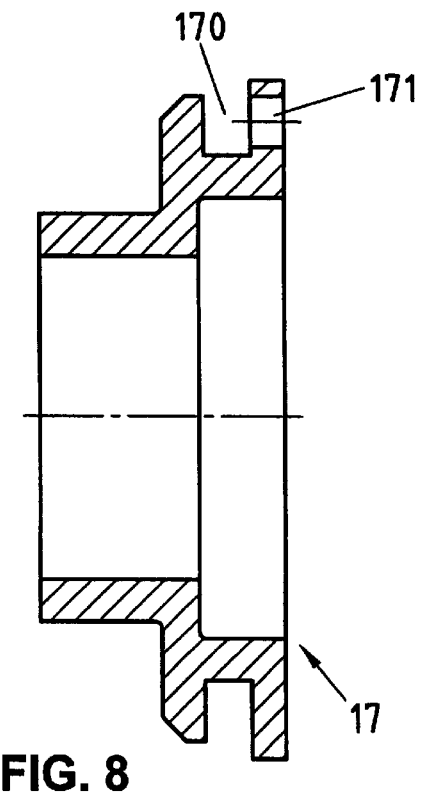
FIG. 8 is a side view of the assembly collar of the two half-shells according to the invention.

FIG. 8 shows the assembly collar 17 of the invention. The assembly collar 17 is forced between the sleeve 10 and the jaw 8, and fulfils several functions simultaneously. It enables, first of all, the two half-shells of the casing 23 to be kept in place, one pressed against the other, and fixed inside a groove 170, the tightness being ensured by the end 300, respectively 320, of two filiform joints 30, respectively 32. It provides moreover a support surface for the compressible element 18 (for example a spring) which allows support of the fixed transducer 19, mounted on the transducer support 16, opposite the scale 20, mounted on the scale support 15. The spring 18 enables irregularities and imprecision, due to manufacturing tolerances, to be compensated, and therefore improves the precision of measurement by guaranteeing the parallelism and the spacing between the transducer 19 and the scale 20, independently of, in particular, the angular position of the scale. A pin engaged in the aperture 171 through the interim piece 17 and in a corresponding aperture in the transducer support 16 allows prevention of the rotation of the latter.

Figure 9:
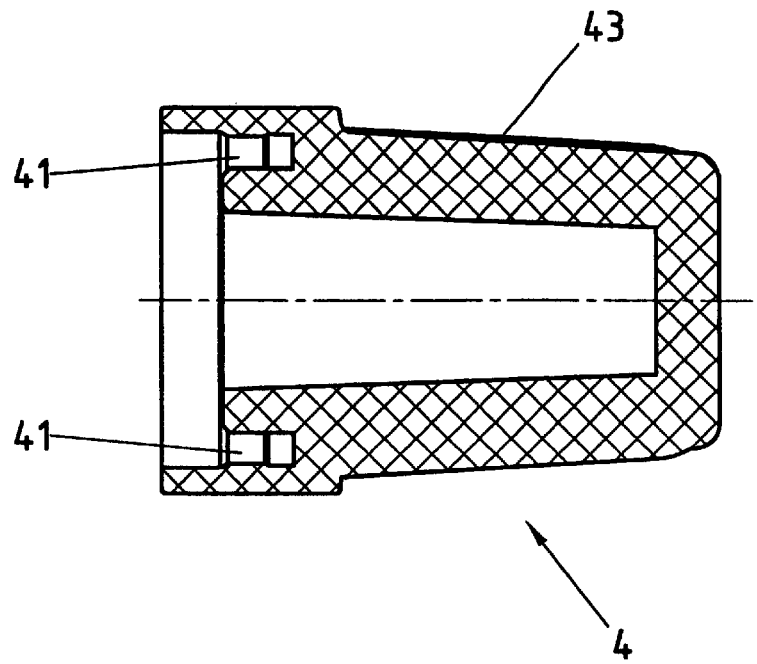
FIG. 9 is a sectional view of the rapid displacement fitting for the micrometric screw.
Figure 9A:
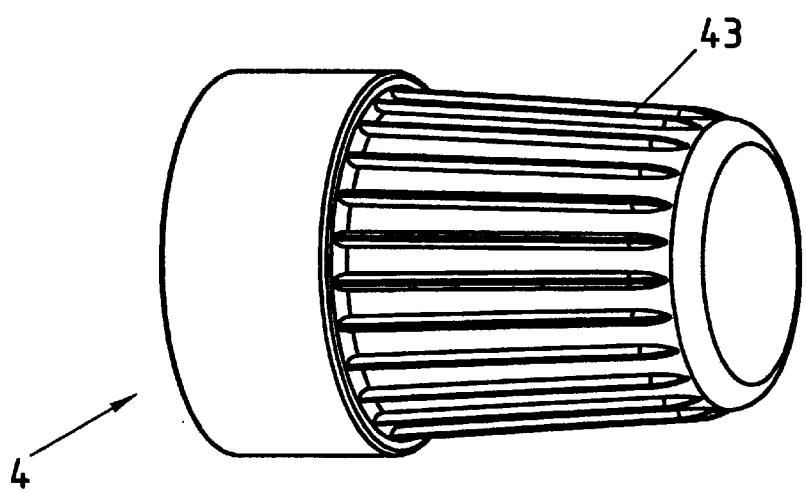
FIG. 9a is a side view of the rapid displacement fitting.
Figure 9B:
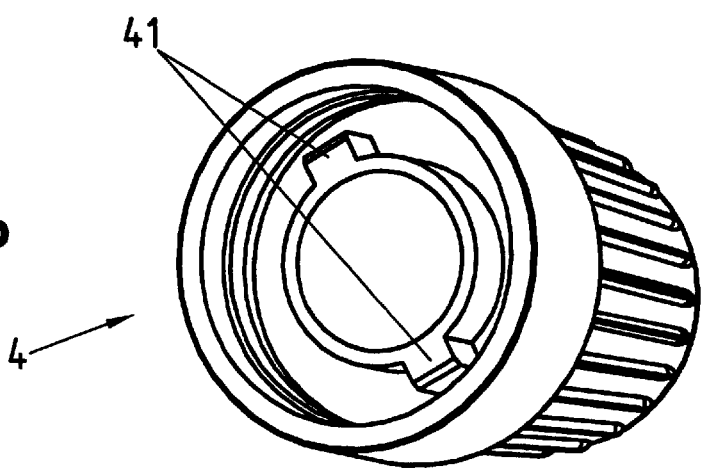
FIG. 9b is a perspective view of the rapid displacement fitting.

FIGS. 9, 9a and 9b illustrate one embodiment of the rapid displacement fitting 4. The rapid displacement fitting allows direct drive of the friction ring 12, and thus of the micrometric screw 1, without using the uncoupling spring 13; the displacement is thus more rapid than that caused by the operation of the thimble 3. The fitting 4 allows moreover the rear end of the friction ring to be obstructed, and the infiltration of water through this channel to be prevented. The tightness is ensured in the example illustrated through deformation of the soft synthetic material making up the fitting when it is hammered on the end of the sleeve. In a variant (not illustrated), an annular joint can be disposed inside the fitting 4 to prevent infiltration between the fitting and the ring 12. The fitting 4 is preferably provided with striations 43 to offer a better hold.

FIG. 10 illustrates in particular the O-ring gasket 40 disposed under the cover 42 of the battery compartment 22. The cover 42 is screwed, or preferably snapped, into one of the half-shells of the casing 23. In closed position, the cover compresses the gasket 40 radially, but not axially; the axial pressure on the gasket is preferably controlled by the geometry of the cover in order to prevent excessive compression of the gasket. The gasket 40 is preferably pulled out of the case integrally with the lid 42 when removing the latter.

FIG. 11 illustrates in particular the serial interface of the micrometer, allowing transmission of the measurement data to an external device, for example a personal computer or a manufacturing machine. The connectors 44 of the interface are accommodated in a recess 48 made in one of the half-shells of the casing 23. When the serial interface is not being used—which the case most often for the majority of applications—the recess 48 is blocked by a plug 46 of soft, synthetic material or of caoutchouc forced into the recess in such a way as to guarantee the tightness. The fore-part 460 of the plug allows it to be pulled out easily between two fingers. A screwed-on or elastically mounted plug, however, can also be realized within the framework of this invention.

The other steps taken to prevent infiltration of water or dust into the internal volume 230 of the casing include in particular an O-ring gasket or at least one other type of suitable joint, at the level of the blocking lever 7. Moreover, the control buttons 9 are made preferably of a soft, synthetic material, for example of silicone elastomer, pressed into the corresponding openings through the casing 23 in such a way as to prevent any infiltration. Other types of sealing plugs using other means can, however, also be easily conceived by one skilled in the art. The electronic display 5, for example a liquid crystal screen, is preferably mounted also inside the internal volume 230 and can be read through a glass, soldered or glued, in a fluid-tight manner, in an aperture through the casing 23.

The different joints described above allow a micrometer to be obtained with a protection rating according to the DIN40050 norm at least equal to IP54, i.e. protected against dust (no harmful deposits) and protected against splashes of water coming from all directions. Other means, such as those known for example in horology, can be conceived within the framework of this invention to further improve the imperviousness of the internal volume 230, depending upon the use foreseen. For example, a valve allowing air to pass but retaining humidity and dust can be used to equalize the internal pressure and the external atmospheric pressure. A capsule with a desiccant can also be disposed in the internal volume 230 in order to absorb the humidity entering, for example, in the form of vapor. It is likewise possible to compartmentalize the internal volume 230 with the aid or one or more internal partitions and to seal independently all or some of the compartments created. Finally, certain especially sensitive components, such as the electronic components, the transducers 19, 20, and/or the threaded parts, etc. can be protected by an impermeable envelope inside the internal volume 230, for example by means of a tube made of a thermosetting shrinkable material.

One skilled in the art will understand that micrometers of very diverse dimensions can be achieved within the framework of this invention, as well as other types of similar devices for measuring lengths, in particular micrometers without integrated anvil 2.

What is claimed is:

1. An electronic micrometer comprising:
   a casing including two half-shells, a pair of joints extending between said two half-shells for forming said casing, and said joints including at least one filiform joint disposed in such a way as to prevent infiltration of water through an interstice between the two half-shells, and defining at least one internal volume, in which are positioned members forming said electronic micrometer, said members including
   a sleeve, at least partially threaded,
   a screw engaged in said sleeve and able to be put in rotation with respect to said sleeve in such a way as to displace itself along the longitudinal measuring axis of the device,
   an electronic measuring system able to measure the relative rotation of the screw with respect to the sleeve and to determine, starting from that measurement, the longitudinal position of the screw, and
   wherein said joints are disposed in such a way as to make the said internal volume fluid-tight.

2. The micrometer according to claim 1, wherein a friction ring exceeds the casing, said joints including an annular joint around said friction ring so as to prevent the infiltration of water along said friction ring.

3. The micrometer according to claim 2, wherein said annular joint has a truncated V-shaped axial joint.

4. The micrometer according to claim 2, wherein an annular closing ring is disposed around said friction ring in addition to said annular joint.

5. The micrometer according to claim 2, wherein the end of said friction ring is blocked in a fluid-tight way.

6. The micrometer according to claim 5, wherein the end of said friction ring is blocked by a rapid displacement fitting for the screw.

7. The micrometer according to claim 6, wherein said rapid displacement fitting is made of synthetic material able to be deformed when mounted at the end of said friction ring so as to prevent infiltration of water between said fitting and said friction ring.

8. The micrometer according to claim 1, wherein said screw comprises a spindle exceeding at least partially said half-shells, said joints including a spindle joint around said spindle so as to prevent infiltration of water between said screw and said sleeve.

9. The micrometer according to claim 8, wherein said spindle joint is a radial lip seal.

10. The micrometer according to claims 1, comprising an assembly collar provided with an annular groove in which the two half shells of the casing are fitted.

11. The micrometer according to claim 1, comprising an electronic measuring display mounted inside said internal volume, the reading of said display being able to be carried out through a window pane fixed in a fluid-tight way in an opening through said casing.

12. The micrometer according to claim 1, comprising at least one control button of soft, synthetic material through said casing, the fluid-tightness around the button being ensured by the deformability of the latter.

13. The micrometer according to claim 12, wherein at least one control button is of silicone elastomer.

14. The micrometer according to claim 1, comprising a locking lever for said screw, an O-ring gasket being disposed in such a way as to prevent infiltration of water around said lever.

15. The micrometer according to claim 1 comprising a battery in said casing and a battery cover allowing access to said battery without taking apart said casing, a joint being provided around said battery cover.

16. The micrometer according to claim 1 comprising a serial interface and a deformable, removable plug allowing said serial interface to be made fluid-tight when it is not being used.

17. The micrometer according to claim 1 wherein said electronic system comprises a transducer and a scale facing said transducer, said scale being put in relative rotation with respect to said transducer upon displacement of said screw, it being possible to determine the position of said screw by means of the relative position of said transducer and of said scale, wherein said transducer is maintained longitudinally facing said scale with the aid of a compressible element.

18. The micrometer according to claim 1 wherein said electronic measuring system comprises a fixed transducer and a scale set in rotation with a screw, the transducer and the scale being provided with a set of capacitive electrodes, the superposition of the two sets of electrodes allowing the angular position of the scale relative to the transducer to be determined.

* * * * *